(12) United States Patent
Toyama (10) Patent No.: US 12,006,742 B2
(45) Date of Patent: Jun. 11, 2024

(54) DOOR HANDLE DEVICE FOR VEHICLE

(71) Applicant: ALPHA CORPORATION, Kanagawa (JP)

(72) Inventor: Takao Toyama, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 225 days.

(21) Appl. No.: 17/395,307

(22) Filed: Aug. 5, 2021

(65) Prior Publication Data

US 2021/0363795 A1    Nov. 25, 2021

Related U.S. Application Data

(63) Continuation of application No. PCT/JP2020/003940, filed on Feb. 3, 2020.

(30) Foreign Application Priority Data

Feb. 8, 2019   (JP) .................................. 2019-021817

(51) Int. Cl.
    *E05B 85/10*    (2014.01)
    *E05B 85/16*    (2014.01)
    *B60J 5/04*     (2006.01)

(52) U.S. Cl.
    CPC ............ *E05B 85/107* (2013.01); *E05B 85/16* (2013.01); *B60J 5/0412* (2013.01)

(58) Field of Classification Search
    CPC ............................. E05B 85/103; E05B 85/107
    See application file for complete search history.

(56) References Cited

U.S. PATENT DOCUMENTS 4,475,754 A * 10/1984 Arlauskas ............... E05B 85/16
                                                   292/336.3
5,123,687 A    6/1992 Pfeiffer et al.
(Continued)

FOREIGN PATENT DOCUMENTS

CN   108193961 A  *  6/2018  ........... E05B 85/107
CN   108222714 A  *  6/2018  ............. E05B 79/14
(Continued)

OTHER PUBLICATIONS

The extended European search report issued by the European Patent Office on Oct. 17, 2022, which corresponds to European Patent Application No. 20752100.6-1005 and is related to U.S. Appl. No. 17/395,307.
(Continued)

*Primary Examiner* — Carlos Lugo
(74) *Attorney, Agent, or Firm* — Studebaker & Brackett PC (57) ABSTRACT

A door handle device for a vehicle includes a handle base, a first link and a second link and an operation handle connected to the first link and the second link and to be driven from an initial position to a use position. The operation handle is manually operable to a latch operation position beyond the use position. The second link includes an end holding spring to apply an urging force to hold a rotation center of the second link and the operation handle at an initial end position. The handle base includes a latch release lever to be driven by the second link with a movement of the operation handle from the use position to the latch operation position and to transmit a latch release operation force to a door latch device fixed to the door.

12 Claims, 8 Drawing Sheets

(56) References Cited

U.S. PATENT DOCUMENTS

| | | | |
|---|---|---|---|
| 10,309,133 B2* | 6/2019 | Han | ............... E05B 79/20 |
| 10,550,611 B2* | 2/2020 | Och | ............... E05B 85/107 |
| 11,214,994 B2* | 1/2022 | Han | ............... E05B 79/06 |
| 11,499,352 B2* | 11/2022 | Guerin | ............... E05B 85/107 |
| 2016/0298366 A1 | 10/2016 | Och | |
| 2020/0087956 A1 | 3/2020 | Guerin | |
| 2020/0102773 A1* | 4/2020 | Sobecki | ............... E05B 85/103 |
| 2020/0115936 A1 | 4/2020 | Och | |
| 2021/0087862 A1* | 3/2021 | Guerin | ............... E05B 81/42 |

FOREIGN PATENT DOCUMENTS

| | | | | |
|---|---|---|---|---|
| CN | 108374615 A | * | 8/2018 | ............ E05B 85/107 |
| CN | 108547523 A | | 9/2018 | |
| CN | 108843162 A | | 11/2018 | |
| DE | 40 02 963 C1 | | 7/1991 | |
| DE | 10 2008 019335 A1 | | 10/2008 | |
| DE | 102017130030 A1 | * | 6/2019 | ............ E05B 81/04 |
| DE | 102017130031 A1 | * | 6/2019 | ............ E05B 85/103 |
| EP | 3396088 A1 | * | 10/2018 | ............ E05B 77/06 |
| EP | 3 404 177 A1 | | 11/2018 | |
| EP | 3 922 790 A1 | | 12/2021 | |
| JP | 3165570 B2 | | 5/2001 | |
| JP | 2016-537532 A | | 12/2016 | |
| WO | WO-2018010939 A1 | * | 1/2018 | ............ E05B 81/76 |

OTHER PUBLICATIONS

International Search Report issued in PCT/JP2020/003940; mailed Mar. 10, 2020.

* cited by examiner

DOOR HANDLE DEVICE FOR VEHICLE

CROSS-REFERENCE TO RELATED APPLICATION

The present application is a continuation application of PCT/JP2020/003940, filed Feb. 3, 2020, that claims priority to Japanese Patent Application No. 2019-021817 filed on Feb. 8, 2019, the entire content of which is incorporated herein by reference.

TECHNICAL FIELD

The present invention relates to a door handle device for a vehicle.

BACKGROUND

Patent Literature 1 (JP2016-537532A) discloses a door handle device for a vehicle.

In the handle device for a vehicle disclosed in Patent Literature 1, the handle device includes an operation lever 20 having one end rotatably connected to a housing portion (a handle base) and the other end rotatably connected to a door handle 14 (an operation handle), and an unlocking lever 32 rotatably connected to the other end of the door handle 14. When the operation lever 20 is rotationally driven, the door handle 14 is moved in parallel from an initial posture to an operating position such that a guide portion 28 fixed to the door handle 14 is guided by a slotted guide 26 formed in the housing portion.

Reference numerals in this column indicate the reference numerals attached to the respective portions in Patent Literature 1, and names of components in parentheses indicate names of components of the present invention corresponding to components of Patent Literature 1.

A guide portion 34 is protruded from one end of the unlocking lever 32, and as the door handle 14 moves to the operating position, the guide portion 34 is guided by a second slotted guide 36 and moves by a first distance.

Thereafter, when the door handle 14 is rotated to an open position, the guide portion 34 is moved to a bottom end portion 54 of the slotted guide 36, and a lock device is released via a Bowden cable 38 connected to the guide portion 34.

In the handle device for a vehicle disclosed in Patent Literature 1, since it is necessary to form the slotted guide to guide the door handle for the door handle to move the door handle in parallel and the second slotted guide to guide a guide portion of the unlocking lever, a structure becomes complicated.

SUMMARY

Illustrative aspects of the present invention provide a door latch device can be operated with a simple structure in a handle device for a vehicle.

According to an illustrative aspect of the present invention, a door handle device for a vehicle includes a handle base 1 configured to be fixed to a door of the vehicle, a first link 2 and a second link 3 each having a first end and a second end, the first ends of the first link 2 and the second link 3 being rotatably connected to the handle base 1 and an operation handle 4 rotatably connected to the second ends of the first link 2 and the second link 3 and configured to be driven from an initial position to a use position with the first link 2 as a driving link. A connection portion at which the operation handle 4 and the second end of the first link 2 are connected with each other includes a first rotation center (C24). Another connection portion at which the operation handle 4 and the second end of the second link 3 are connected with each other includes a second rotation center 8. The operation handle 4 is configured such that the second rotation center 8 is slidable from an initial end position along one of the second link 3 and the operation handle 4, and the operation handle 4 is configured to be manually operable to a latch operation position beyond the use position of the operation handle 4 by the operation handle 4 at the use position being allowed to rotate about the first rotation center (C24). The second link 3 includes an end holding spring 5 configured to apply an urging force to the second rotation center 8 to hold the second rotation center 8 at the initial end position. The handle base 1 includes a latch release lever 7 configured to be driven by the second link 3 along with a movement of the operation handle 4 from the use position to the latch operation position and to transmit a latch release operation force to a door latch device 6 fixed to the door.

Other aspects and advantages of the invention will be apparent from the following description, the drawings and the claims.

BRIEF DESCRIPTION OF DRAWINGS

FIGS. 4A and 4B are cross-sectional views of a main portion illustrating an operation of an operation handle, in which FIG. 4A is a view illustrating a use position, and FIG. 4B is a view illustrating a latch operation position;

FIGS. 5A to 5C are views illustrating a relationship between a second link and a latch release lever, in which FIG. 5A is an enlarged view of a main portion in FIG. 2, FIG. 5B is a view taken in a direction of an arrow 5B in FIG. 5A, and FIG. 5C is a view taken in a direction of an arrow 5C in FIG. 5A;

FIGS. 6A and 6B are cross-sectional views taken along a line 6A-6A in FIG. 5A, in which FIG. 6A is a view illustrating a use position of the operation handle, and FIG. 6B is a view illustrating the latch operation position;

FIGS. 7A and 7B are views illustrating an inertia stopper at a standby rotation position, in which FIG. 7A is a cross-sectional view taken along a line 7A-7A in FIG. 5A, and FIG. 7B is a cross-sectional view taken along a line 7B-7B; and FIGS. 8A and 8B are views illustrating the inertia stopper at a stopper rotation position, in which FIG. 8A is a cross-sectional view taken along the line 7A-7A in FIG. 5A, and FIG. 8B is a cross-sectional view taken along the line 7B-7B.

DESCRIPTION OF EMBODIMENTS

Figure 1:
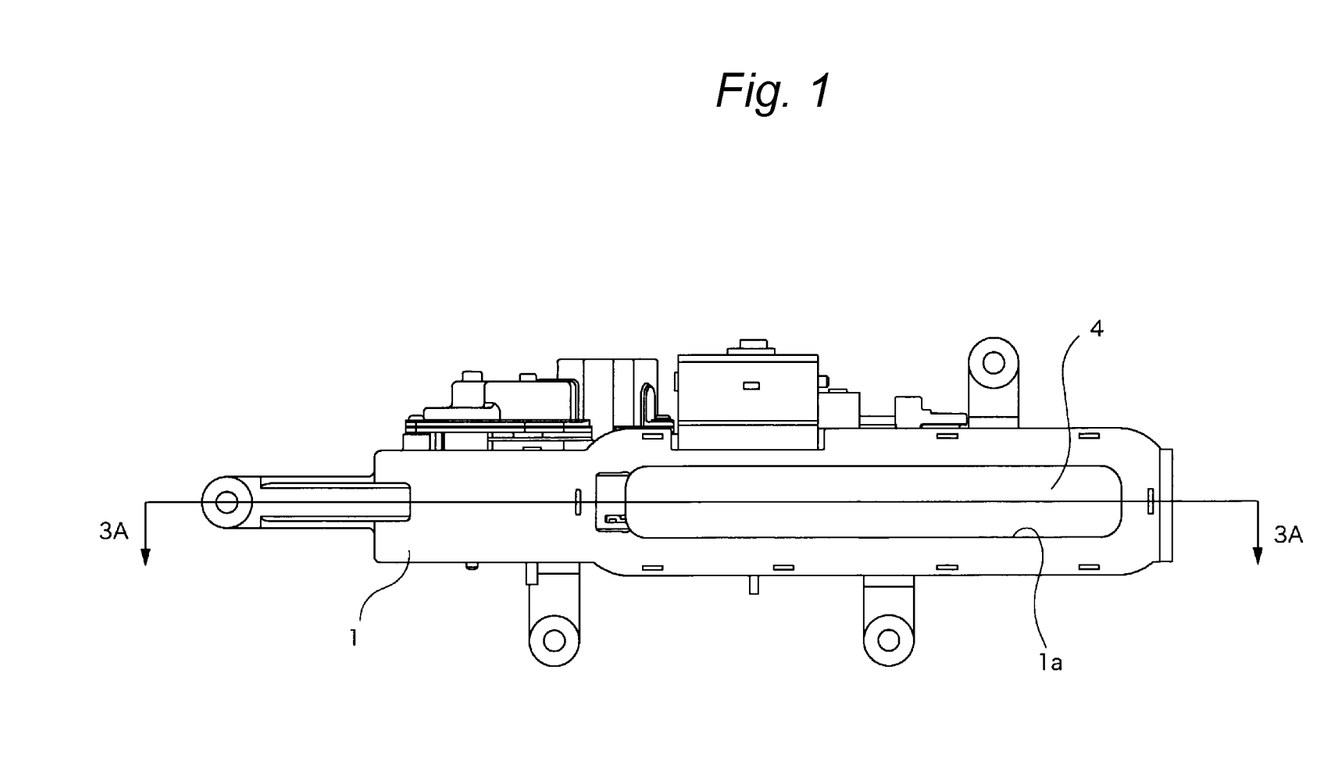
FIG. 1 is a front view of a door handle device.
Figure 2:
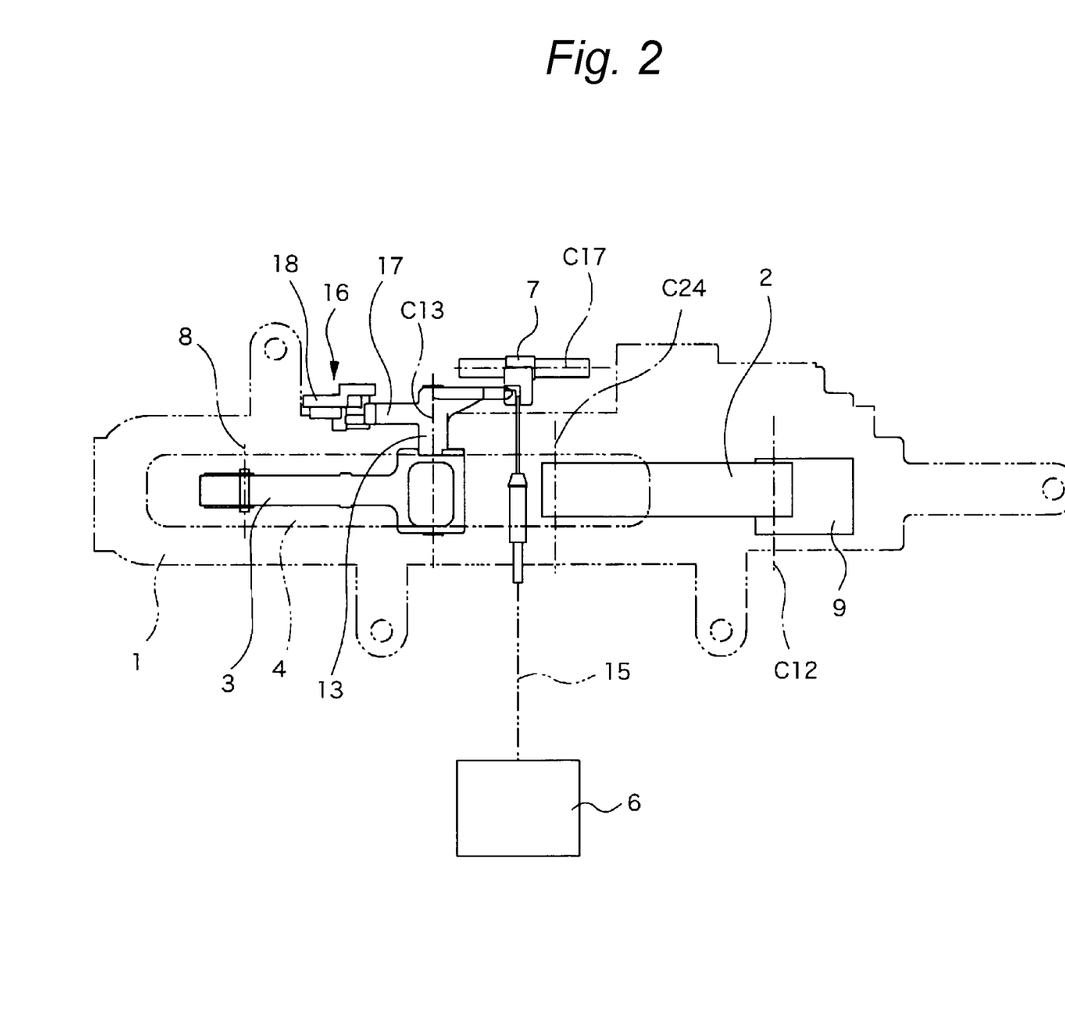
FIG. 2 is a back view of the door handle device.

As illustrated in FIG. 1 and the following drawings, a door handle device includes a handle base 1, an operation handle 4, and a first link 2 and a second link 3 for connecting the operation handle 4 to the handle base 1, and is fixed to a door of a vehicle at the handle base 1.

Figure 3:
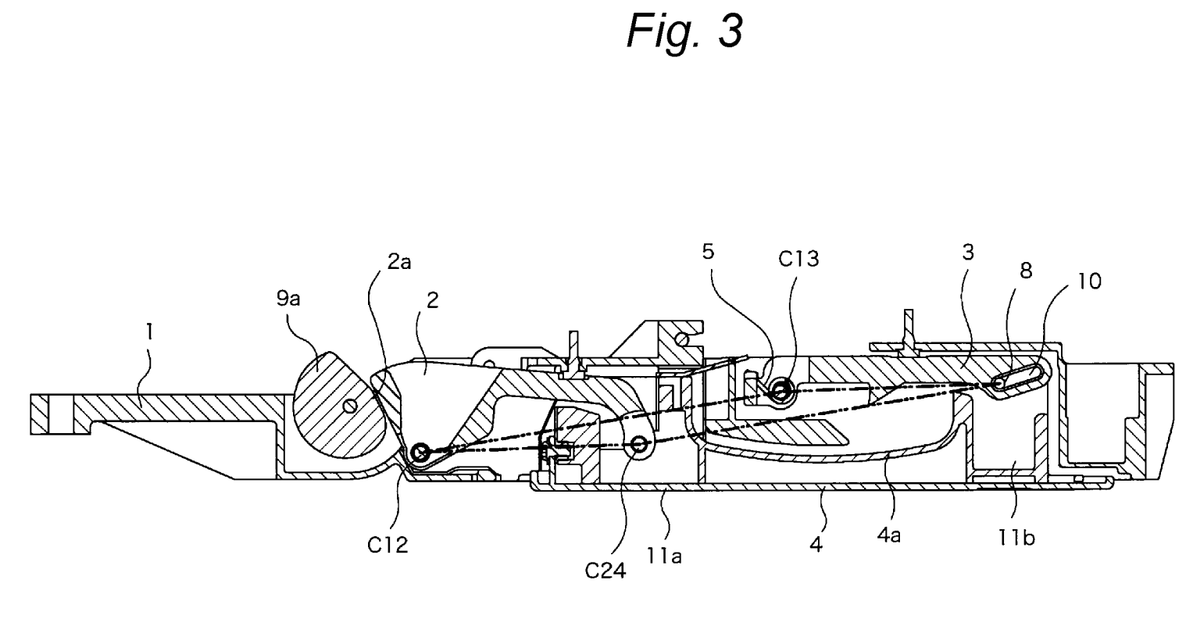
FIG. 3 is a cross-sectional view taken along a line 3A-3A in FIG. 1.
Figure 4A:
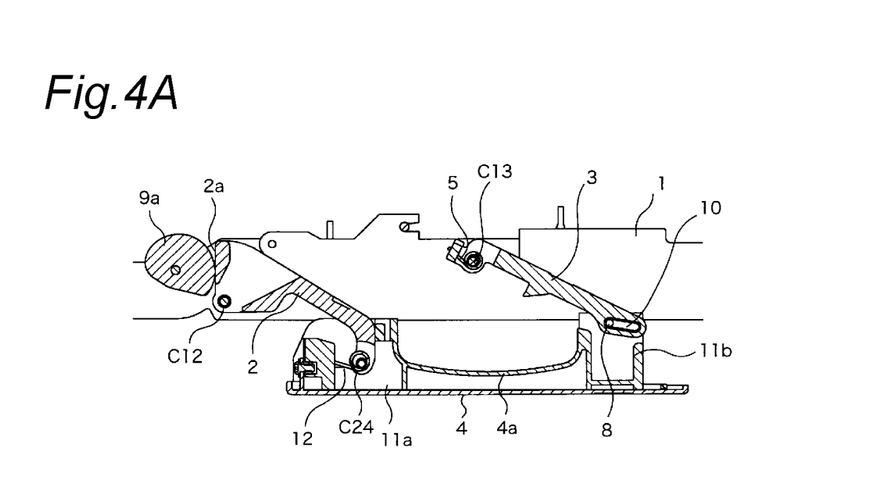
Figure 4B:
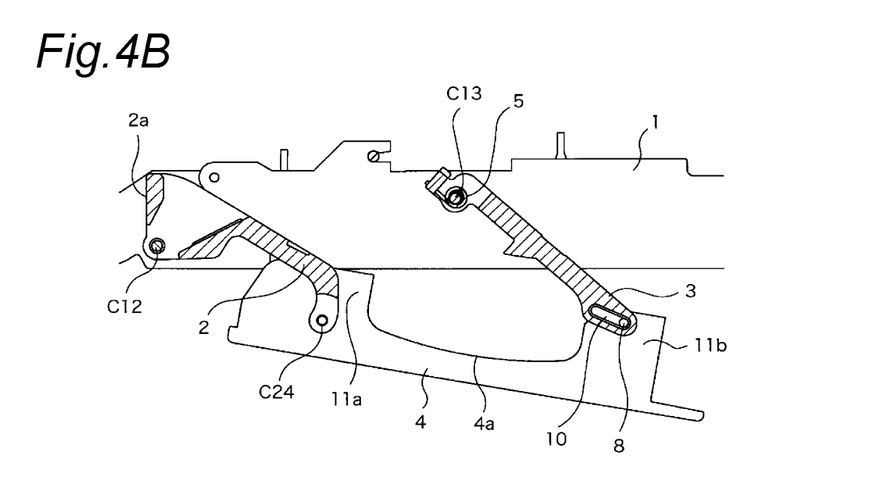

In a state in which the handle base 1 is fixed to the door, the operation handle 4 can be moved from an initial position illustrated in FIGS. 1 and 3, to a use position illustrated in FIG. 4A and to a latch operation position at which one end of the operation handle 4 is pulled further from the use position, as illustrated in FIG. 4B.

The door handle device has a flush surface specification in which, when the operation handle 4 is not in use, the operation handle 4 is accommodated in the door and a surface of the operation handle 4 is substantially in the same plane as a door surface. The initial position of the operation handle 4 corresponds to a non-use posture. The handle base 1 is formed with a handle accommodating recess 1a to accommodate the operation handle 4 at the initial position (see FIGS. 6A and 6B).

As illustrated in FIG. 3, a first link 2 and a second link 3 are connected to the handle base 1 so as to be rotatable about third and fourth rotation centers (C12), (C13). The third and fourth rotation centers (C12), (C13) of the first link 2 and the second link 3 with respect to the handle base 1 are appropriately spaced apart from each other in a front-rear direction, that is, in a longitudinal direction of the handle base 1. The third rotation center (C12) of the first link 2 is disposed in front of the fourth rotation center (C13) of the second link 3.

In this specification, a left side of FIG. 1 is referred to as "front", a right side is referred to as "rear", a front side of a paper surface of FIG. 1 is referred to as a "front surface" direction, and an opposite direction thereof is referred to a "back surface" direction.

Further, an electric actuator 9 such as a motor is fixed to the handle base 1. A cam surface 2a which is in pressure contact with a cam body 9a which is to be rotationally driven by the electric actuator 9 is formed on the first link 2, and when the cam body 9a is rotationally driven, the first link 2 can be rotated about the third rotation center (C12). An urging force in a counterclockwise direction in FIG. 3 is applied to the first link 2 by a torsion spring (not illustrated) wound around the third rotation center (C12), and the cam surface 2a is brought into pressure contact with the cam body 9a.

The operation handle 4 is provided with link connecting portions 11a, 11b protruding toward a back surface side at both front and rear end portions of the operation handle 4, and a handhold recess 4a to serve as a handhold when the operation handle 4 is operated is formed between the link connecting portions 11a, 11b of front and rear portions (see FIGS. 3, 4A, and 4B).

The other end of the first link 2, one end of which is connected to the handle base 1, is rotatably connected to the front link connecting portion 11a of the operation handle 4, and the other end of the second link 3 is connected to the rear link connecting portion 11b.

The second link 3 and the operation handle 4 are rotatably and slidably connected to each other. In this example, a connecting pin, which is fixed to the rear link connection portion 11b and serves as a second rotation center 8, is inserted into a long hole 10 formed in an end portion of the second link 3. Therefore, the connecting pin or the second rotation center 8 is slidable in the long hole 10. The connecting pin is inserted into the long hole 10 and then retained by retaining means as appropriate.

As illustrated in FIG. 3, the third rotation center (C12) of the first link 2 with respect to the handle base 1, a first rotation center (C24) of the first link 2 with respect to the operation handle 4, the second rotation center 8 of the operation handle 4, and the fourth rotation center (C13) of the second link 3 with respect to the handle base 1 are disposed at vertex positions of a parallelogram. In the long hole 10, the position of the connecting pin 8 at the vertex position of the parallelogram is set as one end position (an initial end position), and the long hole 10 extends toward a rear side and a back surface direction, that is, toward a direction in which a link length of the second link 3 can be extended by the connecting pin 8 sliding.

Further, as illustrated in FIGS. 3, 4A, and 4B, by a torsion spring wound around the fourth rotation center (C13) of the handle base 1 and the second link 3, the second link 3 is urged toward an initial rotation position side corresponding to the initial position of the operation handle 4. A torsion spring 12 urging the first link 2 toward the initial rotation position side corresponding to the initial position of the operation handle 4 is wound around the first rotation center (C24) of the first link 2 and the operation handle 4. The torsion spring wound around the fourth rotation center (C13) of the second link 3 and the handle base 1 functions as an end holding spring 5. The end holding spring 5 urges the connecting pin 8 toward the initial end position in the long hole 10, that is, toward a vertex position side of the aforementioned parallelogram, and holds the connecting pin 8 at the initial end position.

Therefore, in this example, when the electric actuator 9 is driven to rotate the cam body 9a counterclockwise in FIG. 3 in a state in which the operation handle 4 is at the initial position illustrated in FIG. 3, the first link 2 rotates clockwise about the third rotation center (C12).

As described above, since the connecting pin of the second link 3 and the operation handle 4 is held at the initial end position at which the link length of the second link 3 is minimized due to the end holding spring 5, the first link, the second link 3, the operation handle 4, and the handle base 1 form a parallel crank mechanism having the handle base 1 as a fixed link. Therefore the operation handle 4 moves from the initial position to the use position illustrated in FIG. 4A by the rotation of the first link 2 while maintaining the parallel posture.

When the operation handle 4 reaches the use position, the driving of the electric actuator 9 is stopped by a switch (not illustrated), and the operation handle 4 is held at the use position, and when the electric actuator 9 is reversely driven from this state, the first link 2 returns to the initial rotation position by the torsion spring 12 wound around the third rotation center (C12), and the operation handle 4 returns to the initial position.

At the use position, the operation handle 4 is held in a posture parallel to the door surface, and thereafter, by pulling out a rear end side of the operation handle 4 to an outer side of the door, the operation handle 4 is rotated about the first rotation center (C24) of the first link 2 and the operation handle 4 until the operation handle 4 comes into contact with a stopper (not illustrated), and as illustrated in FIG. 4B, the operation handle 4 can be moved to a latch release position inclined from a front end portion toward the rear end portion.

As illustrated in FIG. 4B, the rotation of the operation handle 4 from the use position to the latch release position is allowed when the connecting pin slides to an opposite end side of the long hole 10 in the long hole 10 and the link length of the second link 3 becomes substantially longer.

The rotation of the operation handle 4 from the use position to the latch release position is performed manually, and the second link 3 further rotates beyond a use rotation position, which corresponds to the use position of the operation handle 4, and rotates to the latch release rotation position in accordance with the rotation operation of the operation handle 4 to a latch release rotation position.

Figure 5A:
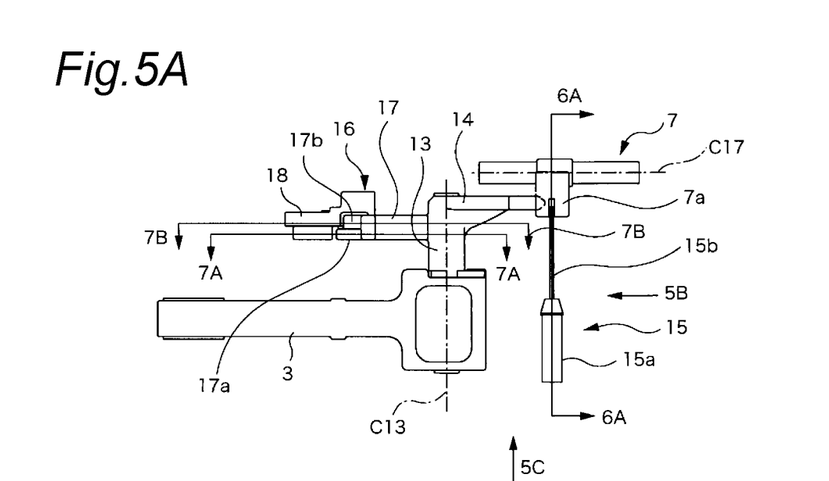
Figure 5B:
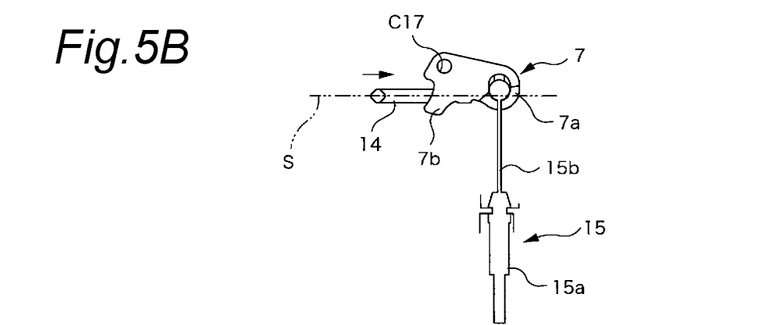
Figure 5C:
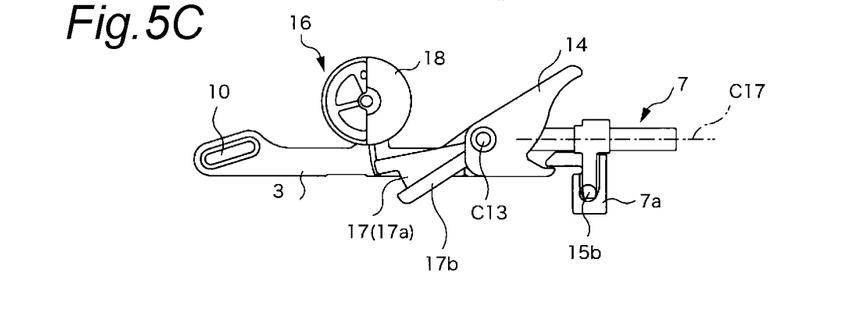

Further, as illustrated in FIGS. 5A to 5C, a support column 13 extending in an axial direction of the fourth rotation center (C13) of the second link 3 with respect to the handle base 1 is erected on the second link 3, and a lever operating protruding portion 14 protrudes toward a front side from a distal end of the support column 13.

Meanwhile, the handle base 1 is provided with a latch release lever 7. The latch release lever 7 includes a cable connecting portion 7a and a driven protruding portion 7b, and is attached to the handle base 1 so as to be rotatable about a rotation center (C17) extending in the front-rear direction. The latch release lever 7 is held clockwise in FIG. 5B, that is, at the initial rotation position illustrated in FIG. 5B by a torsion spring (not illustrated) wound around the rotation center (C17).

As illustrated in FIG. 5B, the driven protruding portion 7b of the latch release lever 7 enters an operating plane(S) of the lever operating protruding portion 14 when the second link 3 rotates, and the lever operating protruding portion 14 moves in an arrow direction in FIG. 5B and clockwise in FIG. 5C along with the movement of the operation handle 4 from the initial position to the use position and to the latch release position.

Figure 6A:
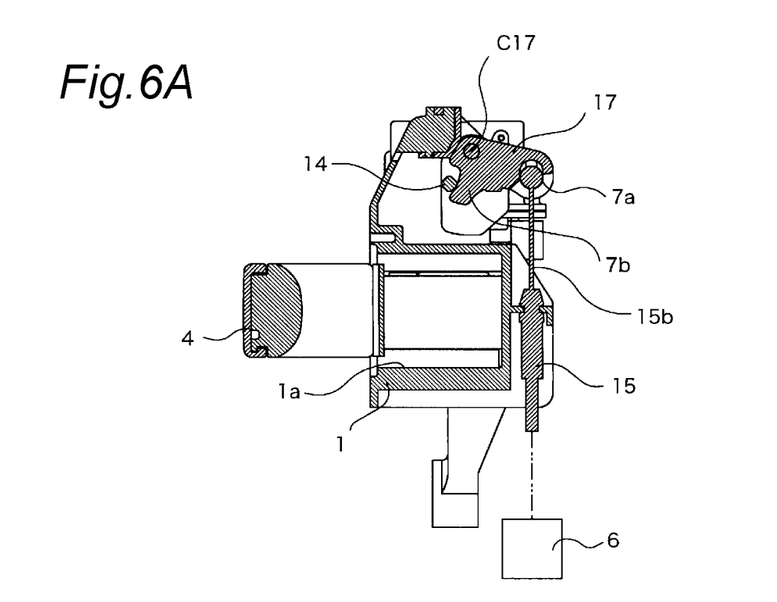

As is clear from FIGS. 5A to 5C illustrating the initial position of the operation handle 4, when the second link 3 is at the initial rotation position, the lever operating protruding portion 14 and the driven protruding portion 7b of the latch release lever 7 do not contact each other, and when the second link 3 is rotated to the use rotation position by operating the operation handle 4 from this state to the use position, the lever operating protruding portion 14 comes into contact with the driven protruding portion 7b as illustrated in FIG. 6A.

Figure 6B:
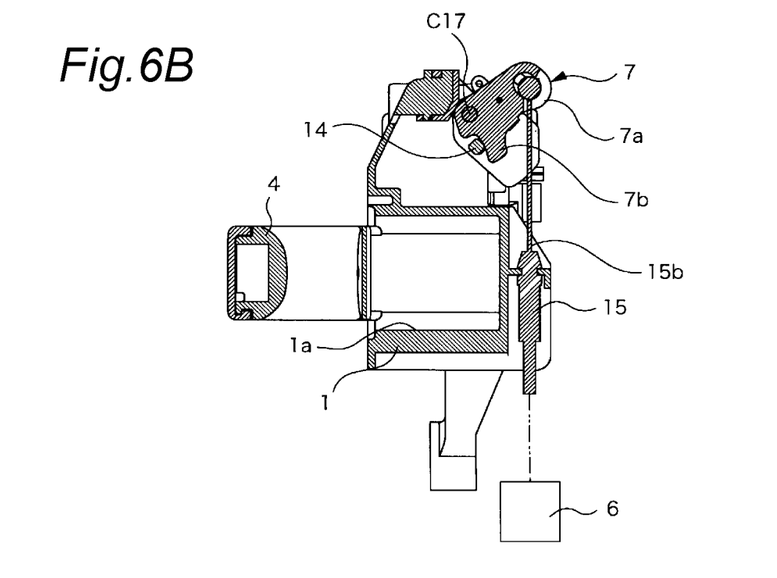

From this state, when the operation handle 4 is rotated to the latch release position and the second link 3 is rotated to the latch release rotation position, as illustrated in FIG. 6B, the lever operating protruding portion 14 pushes the driven protruding portion 7b and rotates counterclockwise about the rotation center (C17) against a reaction force of the torsion spring.

An inner cable 15b of the cable device 15 which is movably inserted into the outer cable 15a is connected to the cable connecting portion 7a of the latch release lever 7. One end of the outer cable 15a of the cable device 15 is fixed to the handle base 1 and the other end thereof is fixed to a door latch device 6 fixed to the door, and when the latch release lever 7 rotates, the operation force is transmitted to the door latch device 6 via the inner cable 15b, and a latch release operation is performed.

Further, an inertia stopper mechanism 16 to prevent the door from being opened when a side collision load is applied to the vehicle is incorporated in the handle device. As illustrated in FIGS. 5A to 5C, the inertia stopper mechanism 16 includes a stopper protruding portion 17 protruding from the support column 13 of the second link 3, and an inertia stopper 18 disposed on the handle base 1.

The stopper protruding portion 17 extends in parallel to the lever operating protruding portion 14 described above. The stopper protruding portion 17 protrudes in a direction opposite to a direction in which the lever operating protruding portion 14 extends, that is, rearward. The stopper protruding portion 17 has a wing piece shape. The stopper protruding portion 17 is formed in a stepped shape including a first stopper 17a, which is parallel to a side wall surface of the second link 3 and faces the second link 3, and a second stopper 17b, which is disposed so as to be stacked on the first stopper 17a in a direction away from the side wall surface of the second link 3 (see FIGS. 7A, 7B, 8A and 8B).

The stopper protruding portion 17 is fixed to the second link 3. The stopper protruding portion 17 rotates about the fourth rotation center (C13) of the second link 3 with respect to the handle base 1 along with the rotation of the second link 3. The stopper protruding portion 17 is at an initial corresponding position shown in FIG. 7A when the operation handle 4 is at the initial position, that is, when the second link 3 is at the initial rotation position. The stopper protruding portion 17 moves to a use corresponding position shown in FIG. 7B when the second link 3 is at the use rotation position.

Figure 7A:
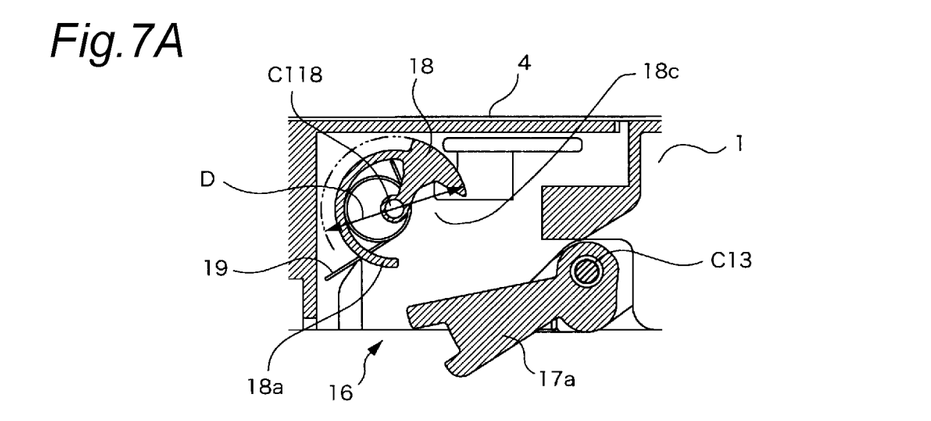
Figure 7B:
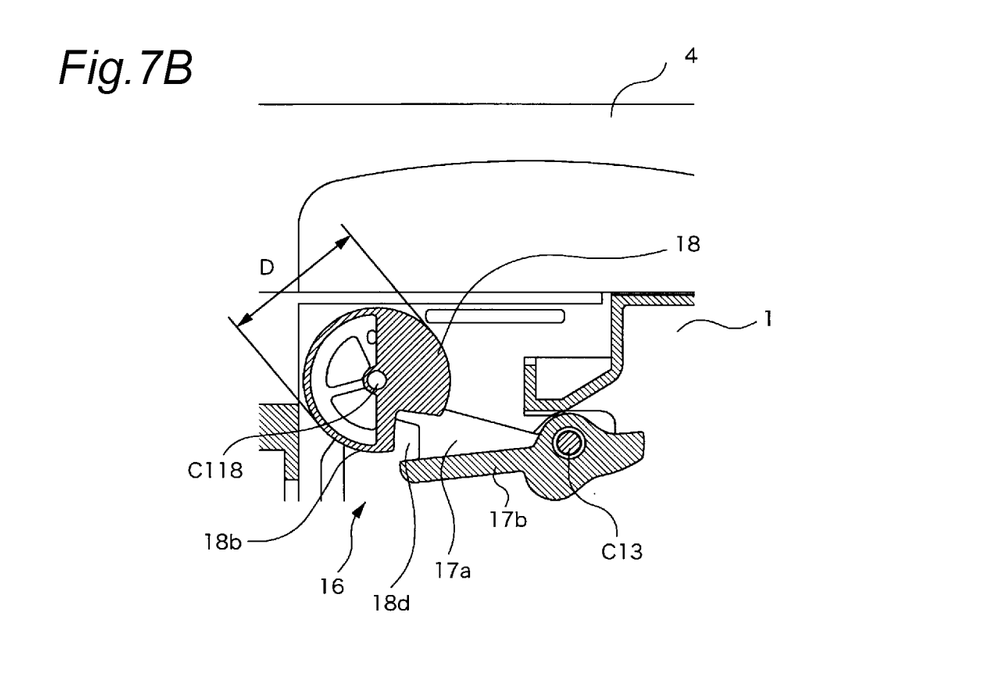
Figure 8A:
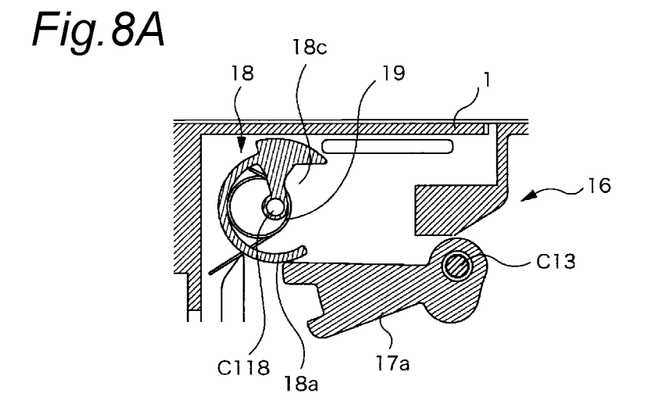
Figure 8B:
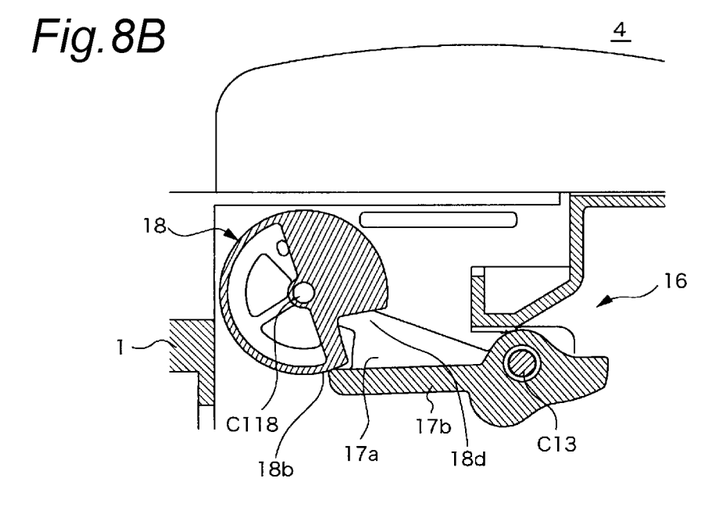

Meanwhile, the inertia stopper 18 is rotatable about a rotation center (C118) between a standby rotation position illustrated in FIGS. 7A and 7B and a stopper rotation position illustrated in FIGS. 8A and 8B. As illustrated in FIG. 7A, the inertia stopper 18 is urged toward a standby rotation position side by a torsion spring 19 wound around the rotation center (C118).

The inertia stopper 18 is formed as a cylindrical body in which a position of the center of gravity is set such that the inertia stopper 18 moves from the standby rotation position to the stopper rotation position due to inertia when a collision force due to a side collision is applied to the inertia stopper 18.

Further, the inertia stopper 18 has first and second stopper surfaces 18a, 18b formed by utilizing a side wall. As illustrated in FIG. 7A, the first stopper surface 18a is disposed on a rotation plane of the first stopper 17a, and is formed to have a diameter smaller than a diameter (D) of the second stopper surface 18b, which is to be described later.

When the inertia stopper 18 is at the standby rotation position, the first stopper surface 18a of the inertia stopper 18 is opened at a position facing the first stopper 17a of the stopper protruding portion 17 which is at the initial corresponding position as illustrated in FIG. 7A, and a gap 18c to allow the first stopper 17a to enter from the opened portion toward inner side is formed. The gap allows the first stopper 17a to move beyond the use corresponding position to a position corresponding to the latch release rotation position of the second link 3.

Meanwhile, when the inertia stopper 18 is at the standby rotation position, the second stopper surface 18b of the inertia stopper 18 is opened at a position facing the second stopper 17b in the use corresponding position as illustrated in FIG. 7B, and is provided with a recess 18d to allow the second stopper 17b to move to a position corresponding to the latch release rotation position of the second link 3.

Therefore, when the inertia stopper 18 is at the standby rotation position, the rotation of the second link 3 is not limited, and the operation handle 4 can be moved to the initial position, the use position, and to the latch release position.

On the other hand, when a side collision force of the vehicle is applied, the inertia stopper 18 rotates from the standby rotation position to the stopper rotation position. When the operation handle 4 is at the initial position, a movement path of the first stopper 17a is blocked by the first stopper surface 18a of the inertia stopper 18 as illustrated in FIG. 8A. When the operation handle 4 is at the use position, a movement path of the second stopper 17b is blocked by the second stopper surface 18b of the inertia stopper 18 as illustrated in FIG. 8B, so that the movement is limited.

As a result, regardless of the position of the operation handle 4, it is possible to reliably prevent the second link 3 from moving due to the side collision and the latch release lever 7 from being operated, and the door from being opened unnecessarily.

The operation handle 4 can operate as a four-bar link mechanism rotatably connected to the other ends of the first link 2 and the second link 3, one ends of which are rotatably connected to the handle base 1, and in this state, the first link 2 can be moved from the initial position to the use position by being driven as the driving link by an electric actuator 9 such as a motor.

Further, the second rotation center 8 of the operation handle 4 and the second link 3 is slidable from the initial end position along one of the second link 3 and the operation handle 4. By pressing the second rotation center 8 against the initial end position by the urging force applied by the end holding spring 5 to restrain the second rotation center 8, it is ensured that the second rotation center 8 operates as the four-bar link mechanism when the first link 2 is driven as the driving link.

By making the second rotation center 8 of the operation handle 4 and the second link 3 slidable, it is possible to move the second rotation center 8 against the urging force applied by the end holding spring 5. As a result, the second link 3 can further rotate about a fourth rotation center (C13) of the second link 3 and the handle base 1 from a use rotation position corresponding to the use position of the operation handle 4. As a result, the operation handle 4 can be manually operated from the use position to the latch operation position, to which the operation handle 4 is further rotated from the use position about a first rotation center (C24) of the first link 2 and the operation handle 4.

The latch release lever 7 attached to the handle base 1 is operated by a rotation operation of the second link 3 to a latch operation rotation position caused by a moving operation of the operation handle 4 to the latch operation position beyond the use position thereof, a latch release operation force is transmitted to the door latch device 6 fixed to the door, thereby making the door latch released, and the door can be opened.

In the embodiment of the present invention in which the operation handle 4 is operated by a simple link mechanism in which the operation handle 4, the first link 2, and the second link 3 are connected to the handle base 1, since it is not necessary to form a guide or the like, the structure can be simplified.

Further, while the first link 2 is driven as the driving link and the operation handle 4 is moving to the use position, the second rotation center 8 of the second link 3 and the operation handle 4 is held at the initial end position due to the end holding spring 5. Therefore, the operation handle 4 reliably behaves as the four-bar link mechanism. As a result, since the second link 3 does not inadvertently move to the latch operation position to operate the latch release lever 7, the operation reliability can be improved, and the structure for urging the second rotation center 8 of the operation handle 4 and the second link 3 to the initial end position can be easily realized, the structure is also simplified.

The second rotation center 8 of the second link 3 and the operation handle 4 is slidable by inserting the pin-shaped second rotation center 8 in a movable manner into the long hole 10 formed in one of the second link 3 and the operation handle 4. In the case where the long hole 10 is provided in the second link 3, the second rotation center 8 can be configured to be slidable in an extension and contraction direction of a link length of the second link 3, and can be held at the initial end position at which the link length of the second link 3 is minimized by the urging force of the end holding spring 5.

The end holding spring 5 may directly press the second rotation center 8 against the end of the long hole 10, or may urge the second link 3 toward an initial rotation position side corresponding to the initial position of the operation handle 4.

Further, when the handle base 1, the first link 2, the second link 3, and the operation handle 4 constitute a parallel crank mechanism having the first link 2 as the driving link in a state in which the second rotation center 8 of the second link 3 and the operation handle 4 is held at the initial end position, the operation handle 4 can be operated in parallel from the initial position.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A door handle device for a vehicle comprising:
   a handle base configured to be fixed to a door of the vehicle;
   a first link and a second link each having a first end and a second end, each of the first ends of the first link and the second link being rotatably connected to the handle base by a respective rotatable connection; and
   an operation handle rotatably connected to the second ends of the first link and the second link and configured to be driven from an initial position to a use position with the first link as a driving link,
   wherein a connection portion at which the operation handle and the second end of the first link are connected with each other includes a first rotation center,
   wherein another connection portion at which the operation handle and the second end of the second link are connected with each other includes a second rotation center,
   wherein the operation handle is configured such that the second rotation center is slidable from an initial end position along one of the second link and the operation handle, and the operation handle is configured to be manually operable to a latch operation position beyond the use position of the operation handle by the operation handle at the use position being allowed to rotate about the first rotation center,
   wherein the second link includes an end holding spring configured to apply an urging force to the second rotation center to hold the second rotation center at the initial end position, and
   wherein the handle base includes a latch release lever driven by a lever operating protruding portion attached to a first end of a support column extending coaxially with the rotatable connection of the first end of the second link, a second end of the support column opposite the first end of the support column being rigidly attached to the second link to rotate with the rotatable connection of the first end of the second link when the operation handle is moved from the use position to the latch operation position, to transmit a latch release operation force to a door latch device fixed to the door.

2. The door handle device for a vehicle according to claim 1,
   wherein the second rotation center is configured to slide along a direction along which a link length of the second link, which is a distance between the second rotation center and a rotation center at which the handle base and the first end of the second link are connected to each other, extends and contracts, and wherein the second rotation center is configured to be held at the initial end position, at which the link length of the second link is minimized, by the urging force of the end holding spring.

3. The door handle device for a vehicle according to claim 1, wherein the end holding spring is a torsion spring wound around a rotation shaft of the second link with respect to the handle base and configured to urge the second link toward an initial rotation position corresponding to the initial position of the operation handle.

4. The door handle device for a vehicle according to claim 1, wherein the handle base, the first link, the second link, and the operation handle are configured to, when the second rotation center is held at the initial end position, form a parallel crank mechanism.

5. A door handle device for a vehicle comprising:

a handle base configured to be fixed to a door of the vehicle;

a first link and a second link each having a first end and a second end, each of the first ends of the first link and the second link being rotatably connected to the handle base by a respective rotatable connection; and an operation handle rotatably connected to the second ends of the first link and the second link and configured to be driven from an initial position to a use position with the first link as a driving link, wherein a connection portion at which the operation handle and the second end of the first link are connected with each other includes a first rotation center, wherein another connection portion at which the operation handle and the second end of the second link are connected with each other includes a second rotation center, wherein the operation handle is configured such that the second rotation center is slidable from an initial end position within a long hole located in one of the second link and the operation handle, the long hole extending from the initial end position in a substantially longitudinal direction of the handle base and toward a back surface of the handle base when the operation handle is in the initial position and the operation handle is configured to be manually operable to a latch operation position beyond the use position of the operation handle by the operation handle at the use position being allowed to rotate about the first rotation center, wherein the second link includes an end holding spring configured to apply an urging force to the second rotation center to hold the second rotation center at the initial end position, and wherein the handle base includes a latch release lever driven by a lever operating protruding portion attached to a first end of a support column extending coaxially with the rotatable connection of the first end of the second link, a second end of the support column opposite the first end of the support column being rigidly attached to the second link to rotate with the rotatable connection of the first end of the second link when the operation handle is moved from the use position to the latch operation position, and to transmit a latch release operation force to a door latch device fixed to the door.

6. The door handle device for a vehicle according to claim 5, wherein the second rotation center is configured to slide along a direction along which a link length of the second link, which is a distance between the second rotation center and a rotation center at which the handle base and the first end of the second link are connected to each other, extends and contracts, and wherein the second rotation center is configured to be held at the initial end position, at which the link length of the second link is minimized, by the urging force of the end holding spring.

7. The door handle device for a vehicle according to claim 5, wherein the end holding spring is a torsion spring wound around a rotation shaft of the second link with respect to the handle base and configured to urge the second link toward an initial rotation position corresponding to the initial position of the operation handle.

8. The door handle device for a vehicle according to claim 5, wherein the handle base, the first link, the second link, and the operation handle are configured to, when the second rotation center is held at the initial end position, form a parallel crank mechanism.

9. A door handle device for a vehicle comprising:

a handle base configured to be fixed to a door of the vehicle;

a first link and a second link each having a first end and a second end, each of the first ends of the first link and the second link being rotatably connected to the handle base by a respective rotatable connection;

an operation handle rotatably connected to the second ends of the first link and the second link and configured to be driven from an initial position to a use position with the first link as a driving link; and an end holding spring;

wherein a connection portion at which the operation handle and the second end of the first link are connected with each other includes a first rotation center, wherein another connection portion at which the operation handle and the second end of the second link are connected with each other includes a second rotation center, wherein the operation handle is configured such that the second rotation center is slidable from an initial end position along one of the second link and the operation handle, and the operation handle is configured to be manually operable to a latch operation position beyond the use position of the operation handle by the operation handle at the use position being allowed to rotate about the first rotation center, wherein the end holding spring urges the second link with respect to the handle base so that the second rotation center is urged toward the initial end position, and wherein the handle base includes a latch release lever configured to be driven by a lever operating protruding portion attached to a first end of a support column extending coaxially with the rotatable connection of the first end of the second link, a second end of the support column opposite the first end of the support column being rigidly attached to the second link to rotate with the rotatable connection of the first end of the second link when the operation handle is moved from the use position to the latch operation position, and to transmit a latch release operation force to a door latch device fixed to the door.

10. The door handle device for a vehicle according to claim 9,
- wherein the second rotation center is configured to slide along a direction along which a link length of the second link, which is a distance between the second rotation center and a rotation center at which the handle base and the first end of the second link are connected to each other, extends and contracts, and
- wherein the second rotation center is configured to be held at the initial end position, at which the link length of the second link is minimized, by the urging force of the end holding spring.

11. The door handle device for a vehicle according to claim 9,
- wherein the end holding spring is a torsion spring wound around a rotation shaft of the second link with respect to the handle base and configured to urge the second link toward an initial rotation position corresponding to the initial position of the operation handle.

12. The door handle device for a vehicle according to claim 9,
- wherein the handle base, the first link, the second link, and the operation handle are configured to, when the second rotation center is held at the initial end position, form a parallel crank mechanism.

* * * * *